Feb. 8, 1966   O. HEIL   3,234,426
METHOD FOR DENSITY MODULATING BEAMS OF CHARGED PARTICLES
Filed June 10, 1960   4 Sheets-Sheet 1
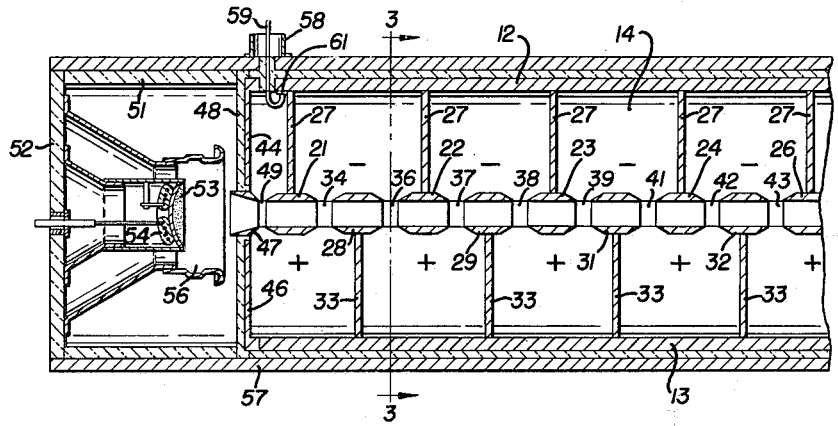
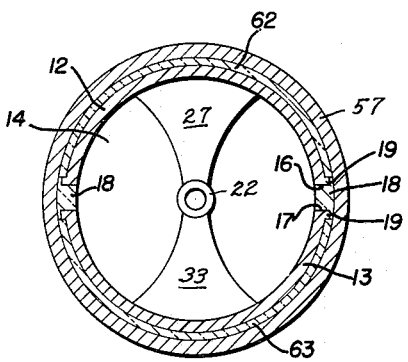
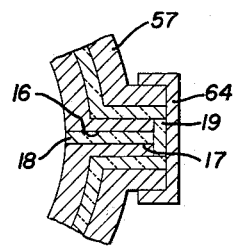
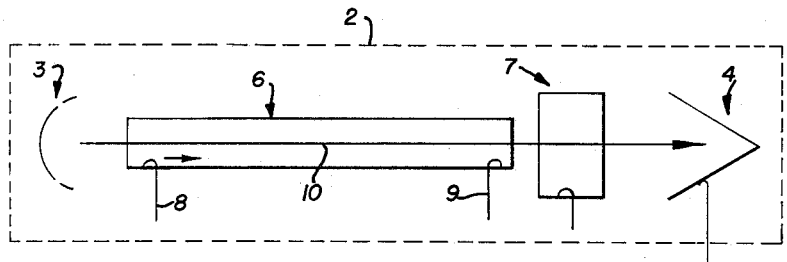
INVENTOR.
OSKAR HEIL
BY
Leon F. Herbert
Robert W. Dilts Feb. 8, 1966     O. HEIL     3,234,426
METHOD FOR DENSITY MODULATING BEAMS OF CHARGED PARTICLES
Filed June 10, 1960     4 Sheets-Sheet 2
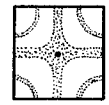
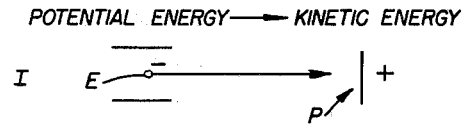
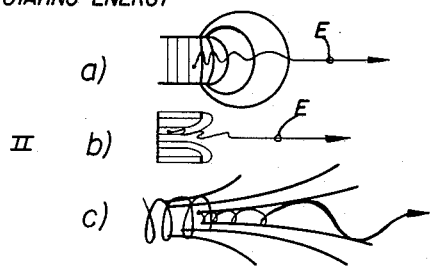
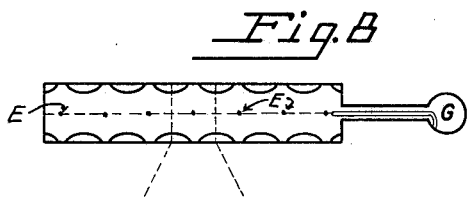
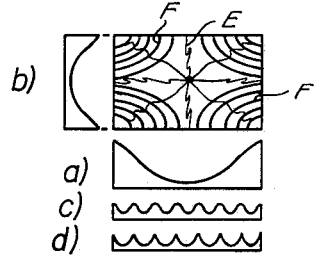
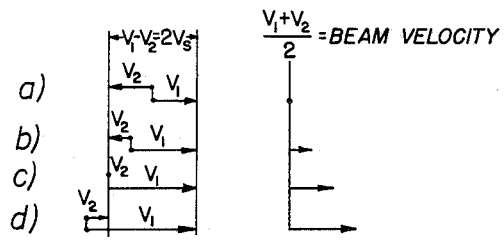
INVENTOR.
OSKAR HEIL
BY Leon F. Herbert
Robert H. Dilts
ATTORNEYS

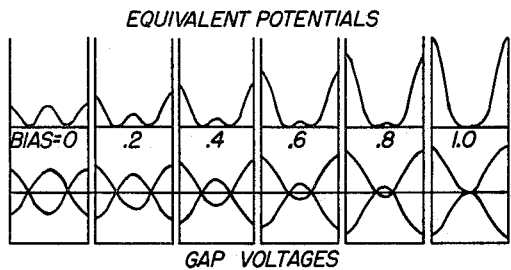
*Fig. 11*
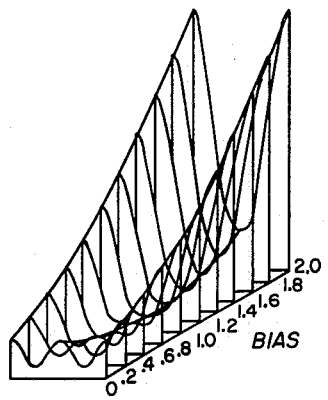
*Fig. 12*
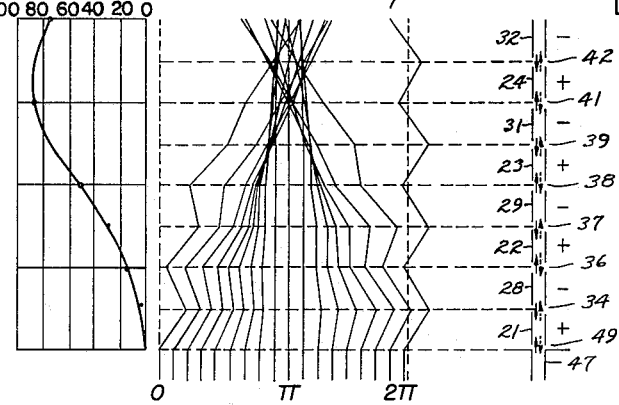
*Fig. 13*
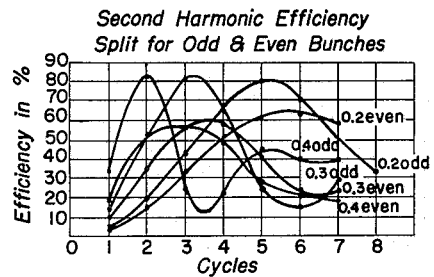
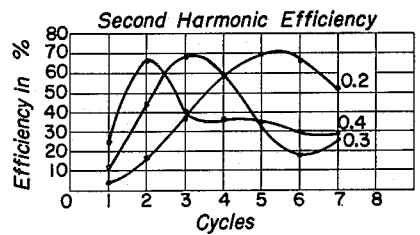
*Fig. 15*

Feb. 8, 1966            O. HEIL            3,234,426
METHOD FOR DENSITY MODULATING BEAMS OF CHARGED PARTICLES
Filed June 10, 1960            4 Sheets-Sheet 4
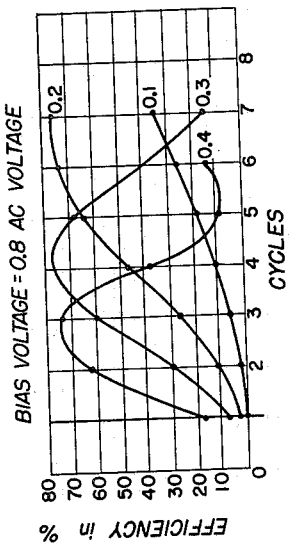
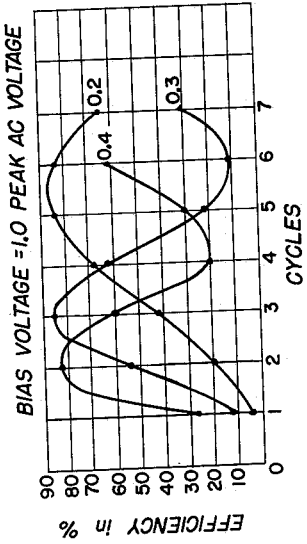
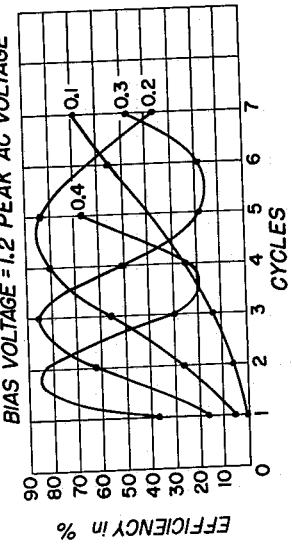
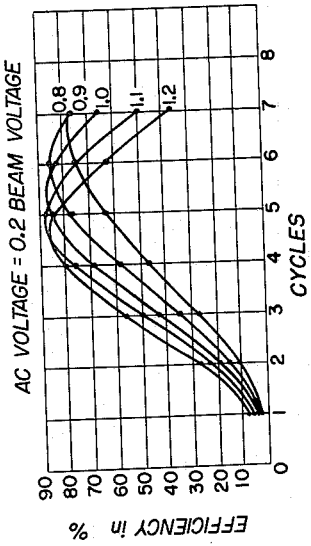
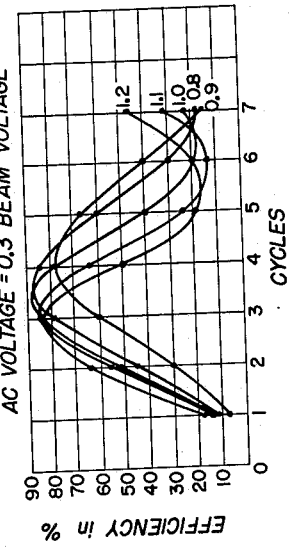
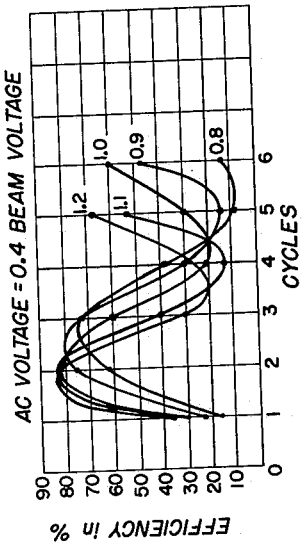
Fig. 14
INVENTOR.
OSKAR HEIL
BY Leon F. Herbert
Robert W. Dilts
ATTORNEYS 3,234,426
METHOD FOR DENSITY MODULATING BEAMS OF CHARGED PARTICLES
Oskar Heil, San Mateo, Calif., assignor to Eitel-McCullough, Inc., San Carlos, Calif., a corporation of California
Filed June 10, 1960, Ser. No. 35,258
7 Claims. (Cl. 315—3.6)

In one of its aspects, my invention relates to a novel method of modulating beams of charged particles, and more particularly to a method of utilizing an inherent phenomenon of electrons to effect bunching of the electrons in a beam.

In another of its aspects, my invention relates to novel electron tube structures adapted to utilize the method, and more particularly to electron beam tubes of the traveling wave and klystron types specially modified to accomplish bunching in accordance with the invention.

The technological advances of the last decade, particularly in the electronics industry, have resulted in electronic systems and components being utilized in wholly new applications which impose new concepts of reliability, life expectancy, efficiency of operation, weight, vibration, acceleration, impact shock and adaptability to extreme fluctuations in temperature and pressure.

As these new applications render such systems and components less accessible, the more critical these qualities become, and the more limited become the sources of supply for components possessing these desirable qualities. For instance, in the electronics industry, the power demanded of high-frequency tubes becomes greater every year, particularly as regards tubes of the beam type such as klystrons and traveling wave tubes. The demands for increased power sometimes become so pressing that other desirable qualities, such as efficiency and light weight, are sacrificed to meet the demand for power. It is therefore one of the objects of the invention to provide a more efficient method of securing well-defined bunching of the charged particles forming the beam in a beam tube, particularly an electron beam tube.

At least two kinds of forces move electrons in electron tubes: first, the well known force which causes an electron to be attracted by a positive charge, and second, a more complicated force which causes an electron to be repelled from a region of electromagnetic turbulence such as is caused by an electromagnetic field which is inhomogeneous in space and varies with time. These conditions may be referred to as space inhomogeneity and time inhomogeneity. The nature of this second force can perhaps be best described in terms of its effects on an electron, which effect is to translate the oscillating motion which an electron experiences in a region of electromagnetic turbulence into a motion of propagation which the electron has when it is repelled from the turbulent region. Accordingly, this second force will be hereinafter referred to as a rectifying force. In the case of the first, or electrostatic force, the space potential to which an electron moves is more positive than the space potential from which it was moved, while in the case of the second, or rectifying force, there is no change in the average space potential.

In the past, longitudinal focusing of electron beams to cause bunching has been accomplished by use of the first type of force. Iit is one of the objects of this invention to accomplish longitudinal focusing of electron beams by use of the second type or rectifying force.

Increasing the degree of longitudinal focusing of an electron beam leads to higher efficiencies; however, in conventional klystrons and traveling wave tubes, this higher degree of longitudinal focusing results in a greater amount of radial defocusing, which has heretofore had to be controlled by an electromagnetic radial-focusing circuit. When the rectifying type of force is used in accordance with the invention to accomplish both longitudinal and radial focusing, these two types of focusing become compatible and can be obtained simultaneously; whereas, when the first type of force is used to achieve longitudinal focusing in conventional beam tubes, radial defocusing is an inherent by-product which results in the need for separate radial-focusing circuitry.

In accordance with the invention it has been found that one way in which the rectifying type of force can be employed to density modulate a moving beam of charged particles is by causing the beam to interact with two electromagnetic waves propagated in opposite directions, one moving with the beam and the other moving in a direction opposite to the beam. It is therefore another object of the invention to provide a method and means for correlating two such oppositely propagated waves with a moving beam of charged particles to effect density modulation of the beam by use of the rectifying type of force.

Another way in which the rectifying type of force can be used to obtain density modulation of a moving beam is to have the beam interact with one moving electromagnetic wave and with a standing wave. Accordingly, it is a still further object of the invention to provide a tube structure in which an electron beam interacts with a standing electromagnetic wave and a moving electromagnetic wave.

In each of the two types of devices described for employing the invention the critical feature is that the two traveling waves combine in the first type, and the traveling and standing waves combine in the second type to appear to the beam as one standing wave moving with the beam and progressively changing the beam into dense longitudinally and radially focused bunches. Thus, a broader object of the invention is to provide a tube structure in which a standing electromagnetic wave is created and caused to move with the beam.

It will be understood more clearly from the detailed description hereinafter but it can be perceived at this point that a standing wave has the attributes required for providing the rectifying type of force. A standing wave has alternate regions of electromagnetic turbulence and relative quiet, and as previously mentioned, the rectifying type of force is caused by a region of electromagnetic turbulentce and results in an electron being repelled from such region. Accordingly, with reference to a standing wave, electrons will be repelled from the areas of turbulence and will be compacted into the areas of relative quiet. It is possible to picture electrons being "shaken" out of turbulent regions and forced to collect in regions of relative quiet or non-turbulence. In order to make use of this descriptive picture, the term "shaking" force will be used hereinafter synonymously with the term rectifying force.

It is known that positively charged particles are amenable to the same type of control as negatively charged particles or electrons, and it is also known that there are a variety of ways of creating alternate regions of relative turbulence and relative quiet with respect to charged particles. Accordingly, it is another object of the invention to provide a device in which a beam of charged particles is caused to interact with regions of relative turbulence and relative quiet.

Yet another object of the invention is the provision of a single cavity klystron in which, with respect to an electron beam, a moving standing-wave is created by the appropriate application of R.F. energy to the cavity and of D.C. potentials on the drift tubes within the cavity.

The invention possesses other objects and features of advantage, some of which, with the foregoing, will be set forth in the following description of the invention. It is to be understood that the invention is not limited to the embodiments disclosed, as I may adopt variant embodiments within the scope of the appended claims.

Briefly described, the invention includes two aspects which comprise the method of simultaneously radially and longitudinally focusing a beam of charged particles by collecting or confining such particles in relatively less "disturbed" or homogeneous regions of appropriate moving electric fields, and the utilization of such focusing method, or aspects thereof, in practical devices. Regarding the method of simultaneously radially and longitudinally focusing the beam of charged particles, it has been found that the inherent oscillating or rotating energy of charged particles in an inhomogeneous field can be transformed into kinetic energy of propagation causing the particles to be trapped or confined in regions of an electric field having homogeneity and surrounded by regions of field inhomogeneity. Since the force in such a field tending to move the particles has both radial and longitudinal components, the particles will be both radially and longitudinally focused. Such regions of homogeneity and inhomogeneity may be formed by generating an electric standing wave in a suitable slow wave structure. Assuming such a standing wave structure to be filled with charged particles such as a uniform electron gas, it will be found that the gas is trapped, collected, or bunched into a series of bunches, one in each half wave. Such a standing wave may be generated in the slow wave structure by propagating two waves having the same frequency and the same velocity in opposite directions to establish what may be termed a resting coordinate system. Transforming such a standing wave or resting coordinate system into a frame of reference traveling with the beam renders the principle applicable to effect discrete bunching of a moving beam of electrons with high efficiency and without the use of external magnetic means. One way such a transformation may be effected is by causing the velocities and frequencies of the two waves to differ, as will be hereinafter described in detail.

Referring to the drawings:

FIGURE 1 is a schematic view illustrating a tube structure capable of utilizing my method of simultaneously radially and phase focusing a beam of electrons.

FIGURE 2 is a vertical half-sectional view of a multigap klystron in which regions of homogeneity and inhomogeneity are provided by the application of D.C. biasing potentials on the drift tubes.

FIGURE 3 is a vertical sectional view taken in the plane indicated by the line 3—3 in FIGURE 2.

FIGURE 4 is a fragmentary sectional view illustrating a modification of the envelope construction shown in FIGURES 2 and 3.

FIGURE 5 is a view illustrating the well known Chladni sound figure conventionally utilized to demonstrate the focusing of cork dust in an acoustic field.

FIGURE 6 is a view illustrating the well known Kundt tube which demonstrates the focusing of cork dust by a standing acoustic wave. FIGURES 5 and 6 will be utilized to explain by analogy the simultaneous radial and longitudinal focusing of electrons in a beam through the use of homogeneous and inhomogeneous regions in an electric field.

FIGURE 7 is a composite view illustrating in I the conventional method of longitudinal focusing (bunching) in klystrons and traveling wave tubes by electrostatic attraction. In (IIa), (IIb), and (IIc) is illustrated the generation of the "shaking" or rectifying force utilized in the present invention for achieving simultaneous radial and phase focusing.

FIGURE 8 is a schematic illustration of a standing electric wave in a slow wave structure, showing the configuration of the wave and the central location of the homogeneous regions in the field.

FIGURE 9 is an enlarged sectional view of the half wave embraced between the dash lines of FIGURE 8 and illustrating the "quiet" or homogeneous region existing in the center of each half wave. Lines of force are pictured by lines of equivalent potential representing the average energy density of the electric field, and the approximate motion of electrons out of the region of "disquiet" or inhomogeneity and into the "quiet" or homogeneous region of the field is also illustrated. The amplitudes of the longitudinal and radial potentials are shown schematically in (a) and (b) of FIGURE 9. Illustrated at (c) and (d) in FIGURE 9 are the actual and ideal wave configurations, respectively.

FIGURE 10 is a graphical representation of various relationships existing between beam and wave velocities.

FIGURE 11 is a graphical representation of the field potentials acting on odd and even gaps for klystron structures in which the widths of the control gaps are equal, and the lengths of the drift tube sections separating the gaps are equal. The field effects of different bias voltage are illustrated, with the corresponding equivalent potentials resulting from these fields shown immediately above.

FIGURE 12 is a schematic view illustrating the surface configuration of a mechanical analogue computer contoured to simulate the potential gradient acting on the electrons in a tube in which the bias potential increases in equal increments as indicated. The computer model was utilized to photograph the trajectory of electrons subject to such biasing potentials, such electrons in the analogue computer model being simulated by balls rolling across the contoured surface of the model.

FIGURE 13 illustrates the motion of electrons in a klystron such as shown in FIGURE 2. The phase location of the electrons is shown in the center of the figure for the preferred drift tube arrangement shown schematically at the right and for a bias potential of 1.0 of the peak A.C. voltage. Efficiency is plotted on the left as it increases along the structure.

FIGURE 14 illustrates similar efficiency curves plotted from values determined by a digital computer for the parameters indicated and at the fundamental frequency.

FIGURE 15 illustrates efficiency curves for the second harmonic frequency at zero bias.

At least two kinds of forces tending to move electrons in electron tubes can be distinguished. FIGURE 7 is a schematic illustration of these two forces. It is, of course, well known that electrons are attracted by bodies charged positively with respect thereto, and that electrons are repelled or "shaken" from regions where they are disturbed. Under the impetus of either of these forces, kinetic energy of propagation is gained by the electron. In the first case, the space potential to which the electron is attracted, or to which it moves, is more positive; in the second case no change of average space potential exists. FIGURE 7 may be utilized to better explain these principles. As shown in (I) of FIGURE 7 an electron E is accelerated from its initial position at the left in the figure toward the more positive potential P on the right, thereby transforming potential energy to kinetic energy. The arrow extending between E and P indicates the direction of motion of the electron. Illustrations (IIa) and (IIb) in FIGURE 7 indicate what happens to an electron when it is "shaken" by a high-frequency field. As shown schematically by the undulated arrow, the electron moves out of the region where it is being "shaken" to a less turbulent or "quiet" area. In (IIa) the inhomogeneity of the field is perpendicular to the lines of force, the electron being "shaken" vertically in the figure and driven toward the right, whereas in (IIb) the inhomogeneity of the field is in the direction of the lines of force and again the electron is "shaken" out of the region of inhomogeneity and to the right. In (IIa) the force which drives the electron outward is centrifugal force, while in (IIb) the force which drives the electron out is the differential effect in the amplitude. Illustrated in (IIc) is the effect on an electron caused to spin in a constant magnetic field. As shown, the electron is driven out of the field in the direction of the arrow. In all three of these latter cases, the electron was oscillating or rotating within the field and therefore had an initial kinetic energy. It has been found that the final kinetic energy of propagation attained by the electron in each of these cases is the same as the initial energy the electron had when it was oscillating or rotating.

In all existing beam tubes, the second kind of "shaking" force described in (IIa), (IIb), and (IIc) is used to focus the beam radially, as in Brillouin flow and periodic electrostatic and magnetic focusing, but for longitudinal focusing (bunching) the first kind of force (electrostatic) is used exclusively in conventional klystrons and traveling wave tubes. I have found that by a proper cooperative relationship of electrical and mechanical parameters, it is possible to achieve simultaneous longitudinal and radial focusing of an electron beam to form discrete bunches by utilization of this second kind of "shaking" force. Two main advantages are derived by so focusing the electron beam. It has been found that when longitudinal and radial focusing are obtained simultaneously by my method, radial defocusing of the bunched beam is automatically controlled; whereas, when longitudinal focusing in klystrons and traveling wave tubes is accomplished electrostatically, it is always associated with an equal amount of radial defocusing of the beam, which must be controlled by external means for high efficiencies. A further advantage is that longitudinal focusing according to my present invention leads to higher efficiencies than are achieved in conventional tubes even with the use of external beam controlling means.

To more clearly explain my method of simultaneous longitudinal and radial focusing reference is made to FIGURES 5 and 6 in which are shown, respectively, the well known Chladni sound figure in which cork dust is focused on a flat plate as the result of the generation of an acoustic field. The acoustic field is generated by a wire passing through the center of the plate, which is caused to vibrate at a given frequency. Vibration of the plate will cause the cork dust to collect in the regions of least vibration. In FIGURE 6, a Kundt tube is shown, in which a plunger moved along a hollow glass cylinder containing cork dust results in the generation of a standing acoustic wave in the tube, causing the cork dust to be focused at spaced intervals along the tube. In both of the devices illustrated in FIGURES 5 and 6 the same kind of force is utilized to focus the cork dust. Removing the force which keeps the cork dust bunched will not affect the dispersion of the cork dust, which will merely come to rest, because of friction between the cork dust particles. If the cork dust is replaced by electrons and ions and the acoustic standing wave is replaced with an electric standing wave in a slow wave structure as shown in FIGURE 8, we arrive at the phenomenon called high frequency plasma confinement, in which the electrons are collected at intervals. As previously explained, cork dust comes to rest due to friction; however, electrons have no friction in the densities with which we are concerned and therefore the bunched electrons will tend to disperse. Thus, FIGURE 8 illustrates schematically such a slow wave structure in which electrons E are confined in the more homogeneous central region of a standing wave generated by an appropriate generator. Formation of the standing wave by the generator causes the field potentials of the wave to be arranged in a manner which literally "shakes" the electrons into the regions of each half wave adjacent the central axis of the slow wave structure. The "shaking" frequency of the generator may be called $f_s$ and the wave velocity of the "shaking" wave may be called $v_s$. The wave length ($\lambda$) of the "shaking" wave is derived by dividing the velocity of the wave by the "shaking" frequency of the generator, or it may be represented by the formula $$\lambda = \frac{v_s}{f_s}$$

From this formula it will be apparent that for the same "shaking" wave length, values of $f_s$ may be selected so long as $v_s$ is varied proportionally.

As illustrated more clearly in FIGURE 9, in the middle of each half wave there exists a "quiet" region of homogeneity to which the electrons are driven. Lines of force F and the approximate motion of the electrons E toward the central region of homogeneity as a result of such force are shown. The magnitude of the force acting on the electrons is proportional to the potentials representing the average energy density of the electric field, and may be represented schematically by longitudinal and radial cross-sections of the main figure in FIGURE 9, thus indicating the extent of simultaneous longitudinal and radial focusing achieved. Such longitudinal and radial cross sections, showing the amplitudes of the potentials, are illustrated in FIGURES 9a and 9b. It will thus be seen that the field potentials form the configuration of a cup in the bottom of which the electrons will collect. Formation of such a potential cup is possible because of positive space charge in the electrostatic field.

Assuming the slow wave structure of FIGURE 8 to be filled with a uniform electron gas, this gas will be compressed into a series of bunches, one in each half wave. The compressions would collect all the electrons in bunches if the equivalent potential distribution in the slow wave structure had the ideal form of a longitudinal series of connected parabolas joined to form sharp peaks, as shown in (d) of FIGURE 9. The actual equivalent potential distribution shown in (c) of FIGURE 9 results in the crests being rounded off, making the outer electrons, or those near the crest, join more slowly and come together when the other electrons have already dispersed, thus diminishing the efficieny of bunching. Thus, the more closely we can approach the ideal parabolic potential distribution, the higher will be the bunching efficiency.

From the foregoing discussion it will apparent that in order to utilize the method of this invention in a practical tube, it is required that the wave-trapped electrons be caused to move. Experiments have indicated that causing a simulated movement of a standing wave in relation to a moving electron beam will result in the moving electrons of the beam being bunched. I have found that this may be accomplished by causing two waves to slip past the moving beam of electrons from opposite directions in a moving coordinate system. As shown in FIGURE 9, if the two waves forming the standing wave run in opposite directions with the same frequency and velocity they will establish a resting coordinate system which will collect a normally uniform electron gas into bunches.

By transforming this resting coordinate system into a moving coordinate system the same mechanism may be used to bunch the electrons of a moving beam. In the moving coordinate system, the velocities of the two opposed waves will differ, as will the frequencies. The actual wave length ($\lambda$) and the velocity difference of the two waves ($2v_s$) will remain constant. In such a moving coordinate system the beam velocity ($v_b$) must be the average of the two wave velocities:

$$v_b = \frac{v_1 + v_2}{2}$$

The wave velocities seen by the beam are therefore equal to the "shaking" velocity ($v_s$) which, in turn, is equal to $$\frac{v_1 - v_2}{2}$$

The frequencies of the two waves may be designated by $f_1$ and $f_2$ and are related to the velocities of the waves by the simple relation:

$$\lambda = \frac{v_1}{f_1} = \frac{v_2}{f_2} = \frac{v_s}{f_s} = \frac{2v_b}{f_b}$$

These relationships are graphically represented in FIGURE 10. In (a) of this figure is illustrated the resting coordinate system previously discussed in which the velocities of the forward and backward waves are equal. In this representation the beam velocity is zero. In (b) the two waves are illustrated traveling in opposite directions with different velocities, the forward velocity being greater than the backward velocity, resulting in a net forward wave velocity or a standing wave in a frame of reference moving with the beam. In other words the frequencies of the two waves and their velocities of propagation along the beam axis are so selected that relative to a charged particle moving at beam velocity said two waves appear as a single standing wave, which wave is therefore moving with the charged particle at beam velocity. In (c) this "moving" standing-wave is formed by one wave having zero velocity at frequency zero, and the forward wave traveling with twice beam velocity and with a frequency equal to the output frequency. In (d) are illustrated two waves traveling in the same direction, with one of the waves traveling at greater than twice beam velocity, while the second wave travels more slowly than beam velocity. As will hereafter be explained, the arrangement depicted in FIGURE 10 is believed to be the most useful because of its simplicity. This relationship requires only one driving frequency ($f_1$) identical with the output frequency. The second frequency ($f_2$) is zero and the "shaking" frequency ($f_s$) is preferably simulated by the motion of the beam past alternate positive and negative D.C. charges on structure associated with the beam. Thus, no driving energy is required for the second frequency ($f_2$), and the wave shape may be chosen at will and is not limited to a sinusoidal form. As will subsequently be apparent, with forms other than sinusoidal higher efficiencies can be obtained. Thus, the amplitude can be changed progressively along the structure, or in other words, a growing wave can be simulated by varying the D.C. charges by progressively increasing increments. It will be apparent that this simulated growth of the forward wave, even without any growth of the second wave, will result in trapping or confinement of the electrons into bunches. The reason lies in the fact that the equivalent potentials surrounding the bunch grow in such a way that the electrons of the bunch are prevented from dispersing. The velocities of the electrons forming the bunch are small and not sufficient to enable the electrons to climb the progressively growing potentials surrounding the bunch.

A practical structure taking advantage of the principle just explained is illustrated in FIGURE 1 of the drawings in which is shown in dash lines an evacuated envelope 2 enclosing an electron gun designated by the numeral 3, a collector electrode 4 at the other end of the envelope, an intermediate slow wave structure 6 interposed between the electron gun and the collector, and an appropriate output interaction region 7 interposed between the slow wave structure and the collector. Correlating the structure illustrated in FIGURE 1 with the frequency-velocity relations for waves illustrated in FIGURE 10 will reveal that when electro-magnetic energy oscillating at a given frequency ($f_1$) is injected into the slow wave structure through the input loop 8 so as to generate a wave having a forward velocity ($v_1$), and introducing a second like frequency ($f_2$) at the input loop 9 having a wave velocity ($v_2$), will result in a standing wave being generated within the slow wave structure. The same conditions for a resting coordinate system as illustrated in FIGURE 8 will thus be established.

If now an electron beam 10 (FIGURE 1) is injected into the system, and the frequency of the input signal at 8 is adjusted to generate a wave moving with the beam at greater than beam velocity, and the frequency of the second or backward wave is adjusted to generate a wave moving against the beam at less than beam velocity as illustrated in (b) of FIGURE 10, the resting coordinating system illustrated in FIGURE 8 will be transformed into a moving coordinate system in which a standing wave may be caused to move longitudinally relative to the slow wave structure, in synchronism with the beam which will result in efficient bunching by the beam of electrons by the rectifying force previously discussed. The bunches so formed will effectively be confined by the equivalent potential distribution illustrated in FIGURE 9, thus permitting the bunched electrons to be utilized in the output interaction region 7 shown in FIGURE 1. From the foregoing it will be seen that the slow wave structure may take many different forms, and that the output interaction region may also take many different forms. My invention, therefore, in one of its aspects, contemplates the method of simultaneously radially and longitudinally focusing the charged particles of a beam in a slow wave structure of whatever design, by contra-traveling waves or simulated waves adapted to confine the particles of the beam into discrete bunches, which bunches are then caused to pass through an output interaction region co-operating with the particle bunches to produce output power.

In FIGURE 2, I show a practical structure in which may be used as the slow wave structure 6 of FIGURE 1, but in which the regions of homogeneity and inhomogeneity are provided by a fundamental driving frequency in conjunction with the application of D.C. biasing potentials on spaced drift tube segments. A better understanding of the operation of this device will be had by correlating FIGURE 2 with FIGURE 13 which illustrates in the center of the figure the motion and phase location of the electrons for the preferred drift tube arrangement shown on the right and in FIGURE 2. As indicated at the top of FIGURE 13, the A.C. voltage is preferably held at 0.3 of the beam voltage, and the bias voltage is preferably held at 1.0 of the peak A.C. voltage. With these parameters the maximum efficiency computed for such a device approaches maximum between the 7th and 8th gaps, as illustrated in the plot on the left of the figure.

As shown in FIGURES 2, 3, and 4, this structure comprises a pair of conductive metallic half shells 12 and 13 having a semi-cylindrical configuration which, when placed in opposed relation as shown best in FIGURE 3, provide a hollow cylindrical resonant cavity 14. Because it is desirable that the two half shells 12 and 13 be capacitively related one with the other, the adjacent edges 16 and 17, respectively, lie circumferentially spaced from each other and are held apart mechanically and insulated electrically by the intervening dielectric strip 18. The dielectric strip may conveniently be a strip of ceramic having oppositely disposed flanges 19 along two longitudinal edges, the strip flanges overlying the flanged edges of the metallic shells. Supported on each half shell in a position to lie coaxialy about the longitudinal axis of the resonant cavity are a plurality of axially aligned and spaced drift tube segments. Drift tube segments 21 through 26 are supported on half shell 12 by support plates 27 which provide broad conducting areas between the shell and the drift tubes. The drift tubes 28 through 32 lie interposed between and in axial alignment with drift tube segments 21–26 and are axially spaced therefrom to provide a series of interaction gaps 34 through 43 therebetween. Integral and conductive end walls 44 and 46 on the shells 12 and 13, respectively, provide a conductive path for the radio frequency current between the drift tube segment 21 and a primary drift tube segment 47 extending on both sides of the walls 44 and 46 to provide a passage therethrough. The primary drift tube segment 47 is supported in electrically insulated relationship with the end walls by a dielectric plate 48 brazed to the plates 44 and 46. It will be seen from FIGURES 2 and 13 that the primary drift tube 47 is separated from the drift tube section 21 by gap 49 having only half the width of succeeding gaps. The significance of this spacing will be explained hereinafter.

Appropriately mounted on the end walls 44 and 46 of the radio frequency structure thus described, is an electron gun structure including a cylindrical wall 51 closed at its outer end by a base plate 52 on which is supported an electron emitting assembly including a cathode 53 and a cathode heater 54. The cathode is conveniently of the matrix type having a concave emitting surface, and a beam forming electrode 56 is preferably associated therewith in a position to form a convergent beam along the axis of the drift tube assembly. To lend mechanical rigidity to the structure thus formed, the entire assembly including the electron gun and radio frequency assemblies are inserts and securely fastened within an enclosing cylindrical metallic tube 57. To excite the cavity 14 with the desired radio frequency energy, a coaxial connection including an outer conductor 58 and an inner conductor 59 are provided, the inner end of the conductor 59 being appropriately brazed to the inner surface of the cylindrical shell 12. A thin ceramic wafer 61 is preferably interposed between the inner end of the inner conductor 59 and the wall of the shell 12 to preclude a conductive path between these two elements. For ease in correlating FIGURE 2 with FIGURE 13, the portion of FIGURE 13 on the right has been provided with appropriate reference numerals corresponding to the numerals indicated in FIGURE 2. As indicated in FIGURES 2 and 13, bias voltages are applied to alternate drift tubes. The drift tubes 21, 22, 23, 24 and 26 are all provided with a high positive bias with respect to the cathode, while the intermediate or interposed drift tubes 28, 29, 31 and 32 are each provided with a negative bias with respect to the cathode. The drift tube segment 47 on the other hand is provided with a positive bias, but the bias potential of this drift tube is preferably only one half of the bias potential applied to the drift tube segment 21. From the foregoing it will be apparent that to impress a biasing potential on the negative drift tubes and on the positive drift tubes is facilitated by the high capacitive spacing of the shells 12 and 13. Thus, a single connection of each of the shells to an appropriate source of biasing potential suffices to charge the respective drift tube segments. If the cavity 14 is now excited by an input frequency through the coaxial connections 58 and 59, it will be seen that the broad conductive areas of the supporting elements 27 and 33 of the drift tubes conductively connect associated drift tube sections.

It will thus be seen that when the cavity 14 is excited by the driving frequency through the coaxial fitting 58–59, the field at each of the gaps is equal; however, because of the spacing of the gap 49 at one half the spacing of the succeeding gaps 34 through 43, the effect of the field on the electron beam at this gap is one half the effect at the succeeding gaps. The purpose for this is that in order to achieve symmetry of modulation of the beam, modulation must commence with one half the effect. Thus in gap 49, the velocity modulation effect caused by the field at this gap will be one half the velocity modulation effected at each of the succeeding gaps. If it happens that the sign of the field at the gap 49 is such as to accelerate the electrons of the beam as they pass through the gap, such electrons will be decelerated in the next succeeding gap by an amount substantially twice the amount of acceleration in the preceding half power gap. Conversely, electrons that are decelerated in the gap 49 will be accelerated in the next succeeding gap by an amount substantially twice the extent of deceleration in the preceding gap. Assuming that the gaps are 180° out of phase with one another, it will be seen that an electron accelerated in gap 49 will achieve corresponding spacial position in the gap 34 in less than the time required for the phase to change. Such electron is said to have experienced a gain in phase. On the other hand, an electron that is decelerated in the first gap 49 will reach a corresponding spacial position in the second gap 34 in a time interval which is longer than the time required for the driving frequency to shift 180° in phase. This electron is said to have experienced a loss in phase. As illustrated in FIGURE 13 such accelerations and decelerations reach a maximum efficiency at the seventh gap in the series. The result of such velocity modulation results in densities in the electron bunches which have not heretofore been achieved. If now the alternate drift tubes are charged with positive and negative bias potentials which are preferably D.C. potentials from an appropriate source not shown, it will be seen that the bunches will be even more densely compacted by the inhomogeneity and homogeneous regions produced by such biasing potentials. Thus, it is seen in FIGURE 13 that regardless of whether the electrons are accelerated or decelerated in the first gap, the effect in the second gap will be substantially twice the effect in the first gap, and the effect due to the succeeding third gap will result in a net gain both in longitudinal and radial focusing of the electron beam.

Because it is desirable that the shells 12 and 13 be capacitively related and electrically insulated from the cylindrical tube 57, dielectric half shells 62 and 63 are interposed between the shells 12 and 13 and the tube 57. In the embodiment shown in FIGURES 2 and 3, cylindrical shell 57 is continuous, whereas in the embodiment shown in FIGURE 4, the outer shell 57 is divided into two parts joined at the midsection opposite the dielectric strip 18 by means of a clamp 64. The opposed or juxtaposed edges 16 and 17 of the shells 12 and 13 in the embodiment of FIGURE 4 are extended to provide a greater capacitance between the shells.

It has been indicated that the preferred bias voltage in a structure similar to FIGURE 2 is 1.0 of the peak A.C. voltage utilized to excite the cavity 14. As indicated in FIGURE 11, the reason for this biasing potential is that the equivalent potential surfaces acting on the electrons become steeper starting with a bias value zero and going to a bias value of 1.0 of the A.C. voltage. The efficiencies achieved using other parameters are shown graphically in FIGURES 14 and 15. The efficiencies depicted in FIGURE 14 are for the fundamental frequency, whereas the efficiency values plotted in FIGURE 15 are for the second harmonic frequency which is responsible for the bunching in FIGURE 2. In both FIGURES 14 and 15, the number of cycles of operation are indicated as abscissa values, while the efficiency in percentage is indicated as the ordinate value. Additional parameters are indicated above each set of curves and at the end of each of the curves. These will be self-explanatory by a mere inspection of the figures.

To test the feasibility of the method disclosed, a mechanical analogue computer was constructed which in conjunction with a rolling steel ball could simulate the action of an electron caught in the potential field generated in a slow wave structure. The analogue computer utilized for its electron deflecting surfaces the potentials indicated in FIGURE 11, which extend from zero bias to a bias of 2.0. The surface configuration of the model was made to correspond to the curvature of the equivalent potentials, as indicated in FIGURE 12. From both FIGURES 11 and 12 it will be seen that with a bias of zero the potential curve is a sine curve of twice the frequency; at very high bias (not shown) the potential curve becomes asymptotically a sine curve for the fundamental frequency, and in between these two extremes any mixing ratio of fundamental and second harmonic may be obtained. It has been found that bias value 1.0 gives the closest approximation to a sawtooth curve for the derivation of maximum force acting on the electrons. It has also been discovered that the amount of amplification obtained for the fundamental frequency is directly proportional to the bias. Thus, if we are interested in high gain, a high bias should be used, and if we are interested in efficiency, the bias should be 1.0 as indicated. The efficiency will then range in the neighborhood of 88%.

The model of the analogue computer, having the surface configuration indicated by the perspective view in FIGURE 12, resulted in photographs indicating the trajectory the elections would follow due to the configuration of the model potentials, which simulate the forces exerted on an electron by the potentials in a slow wave structure. It was found that regardless of where the steel ball entered the model, its trajectory would always end up in the deep valley at the other end of the model, indicating the strong focusing effect of the equivalent potentials.

It is well known in the electronics industry that a large proportion of the cost of electronic components results from the high labor costs required to assemble delicate electronic elements. From the structures shown in FIGURES 1, 2, 3 and 4, it will be apparent that I have devised structures which may be accurately machined and assembled by mass production methods. The devices have additionally been designed to provide maximum rigidity of construction for long life. While I have shown specific devices capable of utilizing my method of simultaneous longitudinal and radial focusing, it will be apparent that other devices are feasible. It should be noted that in the designs illustrated, the necessity for external magnetic circuitry to control the beam has been eliminated. The saving thus effected in terms of dollars spent for labor and materials, and in weight saved, will be obvious to those skilled in the art.

I claim:

1. The method of operating a beam tube to density modulate a normally homogeneous beam of charged particles, said beam tube including means for projecting a homogeneous beam of charged particles, a radio frequency interaction structure through which the beam is projected, utilization means for extracting energy from the beam, and collector means for collecting the beam, said method comprising the steps of energizing said beam projecting means to project a homogeneous beam of charged particles through the interaction structure at a given velocity ($v_b$), establishing two electromagnetic waves in said interaction structure having equal wavelengths and different velocities of propagation ($v_1$, $v_2$) along the axis of said beam in said structure, which velocities are related to said given velocity and to each other according to the formula:

$$v_b = \frac{v_1 + v_2}{2}$$

to simultaneously radially and longitudinally focus the beam into discrete axially spaced bunches of charged particles, extracting energy from said density modulated beam, and subsequently collecting said beam.

2. The method according to claim 1 in which $v_2$ is of opposite sign from $v_b$ representing a wave traveling in the direction opposite from the direction of travel of said beam.

3. The method according to claim 1 in which $v_2$ is zero, representing a wave simulated by a system of alternately positive and negative stationary electric fields in said interaction structure.

4. The method of operating a beam tube having means for projecting a beam of charged particles through an interaction means to density modulate said beam, said method comprising the steps of projecting a beam of particles having a given velocity through said interaction means, and exposing said particles of said beam to the rectifying force produced by creating in said interaction means two electrical charge patterns corresponding to two electromagnetic waves having different frequencies and velocities of propagation along the axis of said beam in said interaction means so selected that their wavelengths in said interaction means are equal and they have velocities of propagation in said interaction means related to each other and to the velocity of the beam according to the following formula:

$$v_b = \frac{v_1 + v_2}{2}$$

where $v_b$ is the velocity of the beam and $v_1$ and $v_2$ are velocities of propagation of the first and second waves respectively.

5. The method as claimed in claim 4, including the additional step of shielding said beam from said rectifying force except at interaction gaps spaced from each other a distance equal to one half of the wavelength of said two electromagnetic waves.

6. The method according to claim 5 wherein the electrical charge pattern corresponding to one of said two electromagnetic waves is created by applying D.C. fields across said interaction gaps which are equal in magnitude and opposite in sign at adjacent interaction gaps, whereby an electromagnetic wave of zero velocity of propagation in said interaction means is simulated, and wherein an electromagnetic wave having a velocity of propagation along the axis of said beam in said interaction structure equal to twice beam velocity is introduced into said interaction means.

7. The method according to claim 6 wherein the magnitude of said D.C. fields applied across said interaction gaps is equal to the peak magnitude of the R.F. fields induced across said interaction gaps by said electromagnetic wave introduced into said interaction means.

References Cited by the Examiner

UNITED STATES PATENTS

| | | | |
|---|---|---|---|
| Re. 22,724 | 2/1946 | Varian | 315—5.45 X |
| 2,455,269 | 11/1948 | Pierce | 315—5.51 X |
| 2,768,322 | 10/1956 | Fletcher | 315—315 |
| 2,800,604 | 7/1957 | Beaver | 315—3.5 |
| 2,845,571 | 7/1958 | Kazan | 315—3.5 |
| 2,867,748 | 1/1959 | Van Atta et al. | 315—5.42 |
| 2,924,738 | 2/1960 | Chodorow | 315—3.5 |

GEORGE N. WESTBY, *Primary Examiner.*

ARTHUR GAUSS, *Examiner.*